United States Patent [19]

Shakespear

[11] 4,235,456
[45] Nov. 25, 1980

[54] PASSIVE OCCUPANT RESTRAINT SYSTEM

[75] Inventor: Horacio Shakespear, West Bloomfield, Mich.

[73] Assignee: General Motors Corporation, Detroit, Mich.

[21] Appl. No.: 946,387

[22] Filed: Sep. 27, 1978

[51] Int. Cl.³ .............................................. B60R 21/10
[52] U.S. Cl. .................................. 280/804; 180/268; 280/807; 280/808; 297/468; 297/474; 297/483
[58] Field of Search ................................ 280/744–747, 280/801, 802, 803, 804, 807, 808; 297/388, 389, 468, 475, 474, 483, 484, 469; 180/82 C, 103 A, 268

[56] References Cited

U.S. PATENT DOCUMENTS

| 3,583,726 | 6/1971 | Lindblad | 280/150 SB |
| 3,754,776 | 8/1973 | Cataldo et al. | 280/150 SB |
| 3,770,078 | 11/1973 | Keppel et al. | 180/111 |
| 3,781,034 | 12/1973 | Botnick et al. | 280/150 SB |
| 3,822,896 | 7/1974 | Hallberg | 297/388 |
| 3,833,239 | 9/1974 | Coenen | 280/150 SB |
| 3,976,305 | 8/1976 | Fieni | 280/744 |
| 3,995,884 | 12/1976 | Bauer et al. | 280/745 |
| 4,124,224 | 11/1978 | Matsuoka | 280/745 |

FOREIGN PATENT DOCUMENTS

| 2257565 | 6/1974 | Fed. Rep. of Germany | 297/475 |
| 2248636 | 12/1977 | Fed. Rep. of Germany | . |
| 1332741 | 10/1973 | United Kingdom | 280/745 |

Primary Examiner—John J. Love
Assistant Examiner—D. W. Underwood
Attorney, Agent, or Firm—Charles E. Leahy

[57] ABSTRACT

A track extends longitudinally inboard an occupant seat and mounts a belt carriage which slidably receives lap and shoulder belts having their outboard ends attached to the door and their inboard ends attached to the vehicle structure forwardly of the occupant. A spring urges forward movement of the carriage to stow the belts forwardly of the occupant. A lever arm associated with the door is connected with the carriage by a cable and pulley arrangement which retracts the carriage in the rearward direction as the door is closed to establish the lap and shoulder belts in their respective restraining positions without necessity of a latching arrangement to maintain the carriage in the rearward position during emergency restraint of the occupant. In a vehicle body having a center occupant, the track is located on or below the floor and mounts the outboard ends of lap and shoulder belts for the center seating position so that forward movement of the carriage permits the center seat occupant to ingress and egress through the door.

5 Claims, 3 Drawing Figures

PASSIVE OCCUPANT RESTRAINT SYSTEM

The invention relates to a passive occupant restraining lap and shoulder belt system.

BACKGROUND OF THE INVENTION

It is well known in motor vehicles to restrain an occupant in the seat by a lap belt disposed across the lap and a shoulder belt disposed diagonally across the chest. It is also known to connect the outboard belt ends to the door so that the belt is automatically moved between a restraining position about the occupant and a stowed position outwardly and forwardly of the seat in response to movement of the door between open and closed positions.

It also has been recognized that passive seat belt systems are further improved by moving the outboard belt ends forwardly and/or upwardly upon opening movement of the door to facilitate ingress or egress.

There are also patents which recognize the advantage of moving the inboard end of the lap belt upwardly and forwardly. For example, U.S. Pat. No. 3,833,239 issued to Coenen Sept. 3, 1974 and German Offenlegungsschrift No. 2,248,636 both provide a track which extends longitudinally of the vehicle body inboard the occupant seat for moving a belt carriage forward and rearward to move the inboard belt portion forwardly upon opening movement of the door. Coenen provides a locking retractor at the rearward end of the track for fixing the belt length to thereby retain the belts in the rearward restraining position. The German Offenlegungsschrift provides a latch acting between the carriage and the track to retain the carriage in the rearward restraining position.

SUMMARY OF THE INVENTION

The present invention provides a new and improved lap and shoulder belt system wherein the inboard track mounted belt carriage is drivably coupled with the door to forcibly move the carriage to the rearward occupant restraining position when the door is closed so that the belt loads inducing forward movement of the belt carriage are counterbalanced by the belt loads urging closure of the door to thereby obviate the need for a latching mechanism to fix the belt at the restraining position.

The present invention also provides a new and improved lap and shoulder belt system for both an occupant seated adjacent the door and a center seat occupant and provides unobstructed door access for the center seat occupant.

According to the invention, the lap and shoulder belts have their outboard ends mounted on the door and their inboard ends attached to the vehicle body forwardly of the seat. A track extends longitudinally inboard the seat and mounts a belt carriage which slidably receives the lap and shoulder belts intermediate their respective inboard and outboard ends to dispose the lap and shoulder belts in restraining positions closely adjacent the occupant when the carriage is at a rearward position and to dispose the belts in an occupant access position stowed forwardly of the occupant when the carriage is moved forwardly along the track. A spring acts upon the carriage to induce forward movement of the carriage to move the belts to the stowed position. A lever arm is operably associated with the door for movement therewith about the hinge axis of the door and has an inboard end which moves rearwardly when the door is opened and forwardly when the door is closed. A pulley is mounted on the body adjacent the rearward end of the track and receives a cable having one end attached to the carriage and the other end attached to the inboard end of the lever arm. When the door is pulled closed, the forward movement of the lever arm inboard end retracts the cable about the pulley to draw the carriage in the rearward direction establishing the lap and shoulder belts in their respective restraining positions. During restraint of the occupant, the loads imposed upon the seat belt urge closing movement of the door and forward movement of the carriage. The cable and lever arm arrangement coupling the carriage with the door effectively retain the carriage in the rearward position without necessity of a latching arrangement to maintain the lap and shoulder belts in their occupant restraining positions.

The invention also provides passive occupant restraint for a center seat occupant. The track is mounted on or below the floor level and the carriage is movable rearwardly through a space in the seat cushion between the passenger seat adjacent the door and the center occupant seat. The ends of the lap and shoulder belts for the center seat occupant are mounted on the carriage so that the center seat occupant may ingress and egress through the door when the carriage is in the forward position.

Accordingly, one object, feature and advantage of the invention resides in the provision of a driving connection between a vehicle door and an inboard track mounted seat belt carriage so that the closed door holds the carriage in a rearward position maintaining the belts in the occupant restraining positions.

A further object, feature and advantage of the invention resides in the provision of a floor mounted belt carriage located between first and second seats for moving restraint belts for both seat occupants between a rearward restraining position and a forward stowed position permitting access of both occupants to a door located adjacent the first occupant.

DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
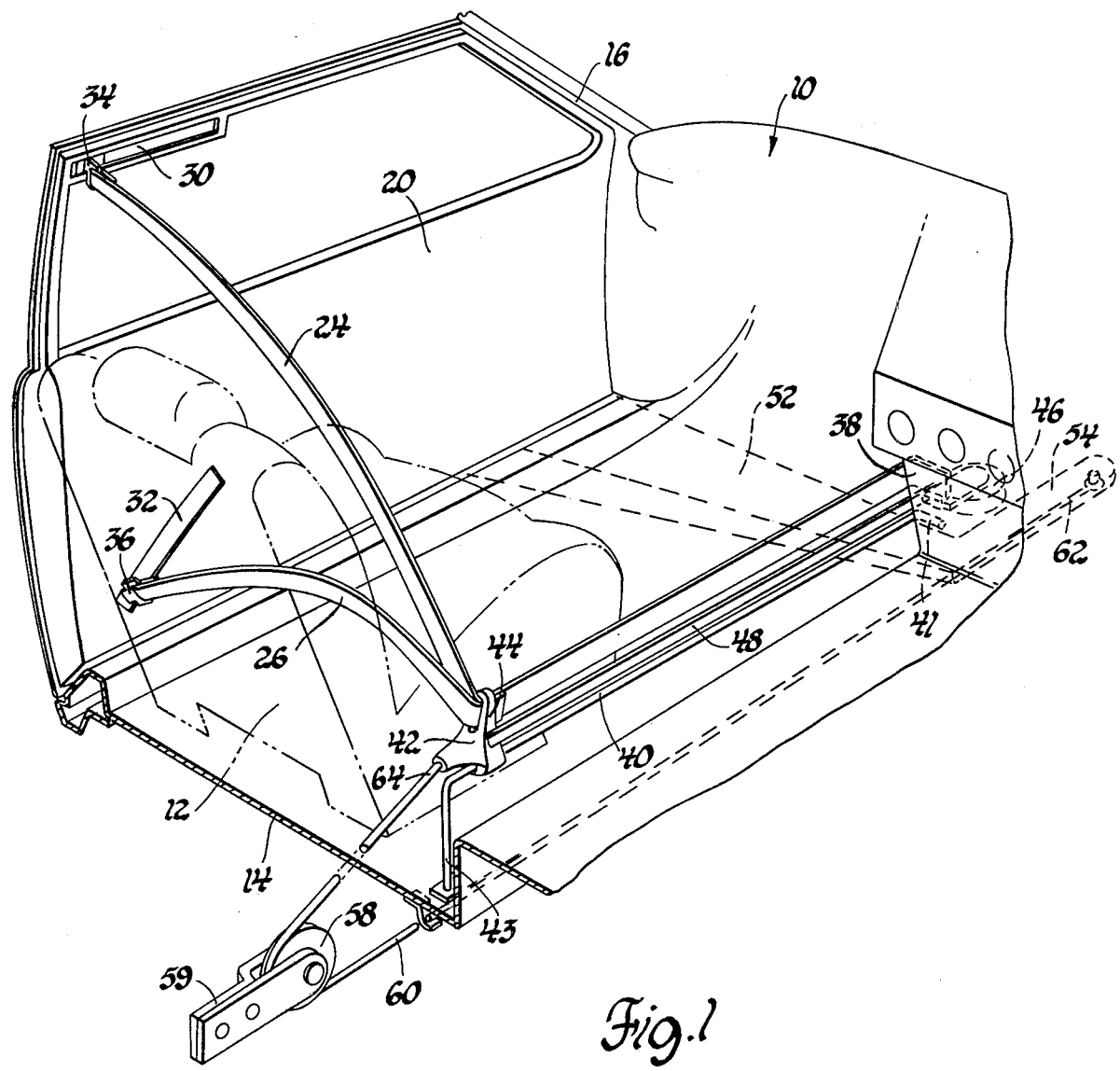
FIG. 1 is a perspective view of a motor vehicle occupant compartment having a belt system according to the invention with the lap and shoulder belts shown in their respective rearward occupant restraining positions when the door is closed.

Referring to FIG. 1, a vehicle body generally indicated at 10 defines a passenger compartment in which a driver seat 12 is mounted on floor pan 14 for seating an occupant. The vehicle body 10 has a door opening 16 which is selectively closed by a door 20 having its forward end pivoted to the vehicle body.

A restraint belt arrangement includes a shoulder belt 24 and a lap belt 26. The outboard ends of the lap and shoulder belts 24 and 26 are suitably connected to the vehicle door 20 by linear locking retractors generally indicated at 30 and 32. A suitable such linear locking retractor is disclosed in commonly assigned U.S. Pat. applications Ser. No. 914,394, filed June 12, 1978 by David F. Manz et al now U.S. Pat. No. 4,159,848, or Ser. No. 914,621, filed June 12, 1978 by Clarence C. Irwin et al. Another suitable such device is disclosed in U.S. Pat. No. 3,770,078, issued Nov. 6, 1973 to Keppel et al. For purposes of the present invention, it will be sufficient to understand that the linear retractors 30 and 32 have belt carriages 34 and 36 which are normally retracted along a track in the rearward direction and have associated locking mechanisms which prevent extension of the belt under emergency conditions to thereby establish the outboard ends of shoulder belt 24 and lap belt 26 in their respective restraining positions of FIG. 1.

Referring again to FIG. 1, it is seen that the inboard end of the shoulder belt 24 is suitably attached to the vehicle body structure at a point 38 inboard and generally forward the seat 12. Although FIG. 1 shows the lap belt as being sewn to the shoulder belt 24 at a juncture point generally adjacent the hip of the occupant, it is understood that the lap belt 26 may be separately extended to the point of attachment 38 on the vehicle body structure.

Figure 2:
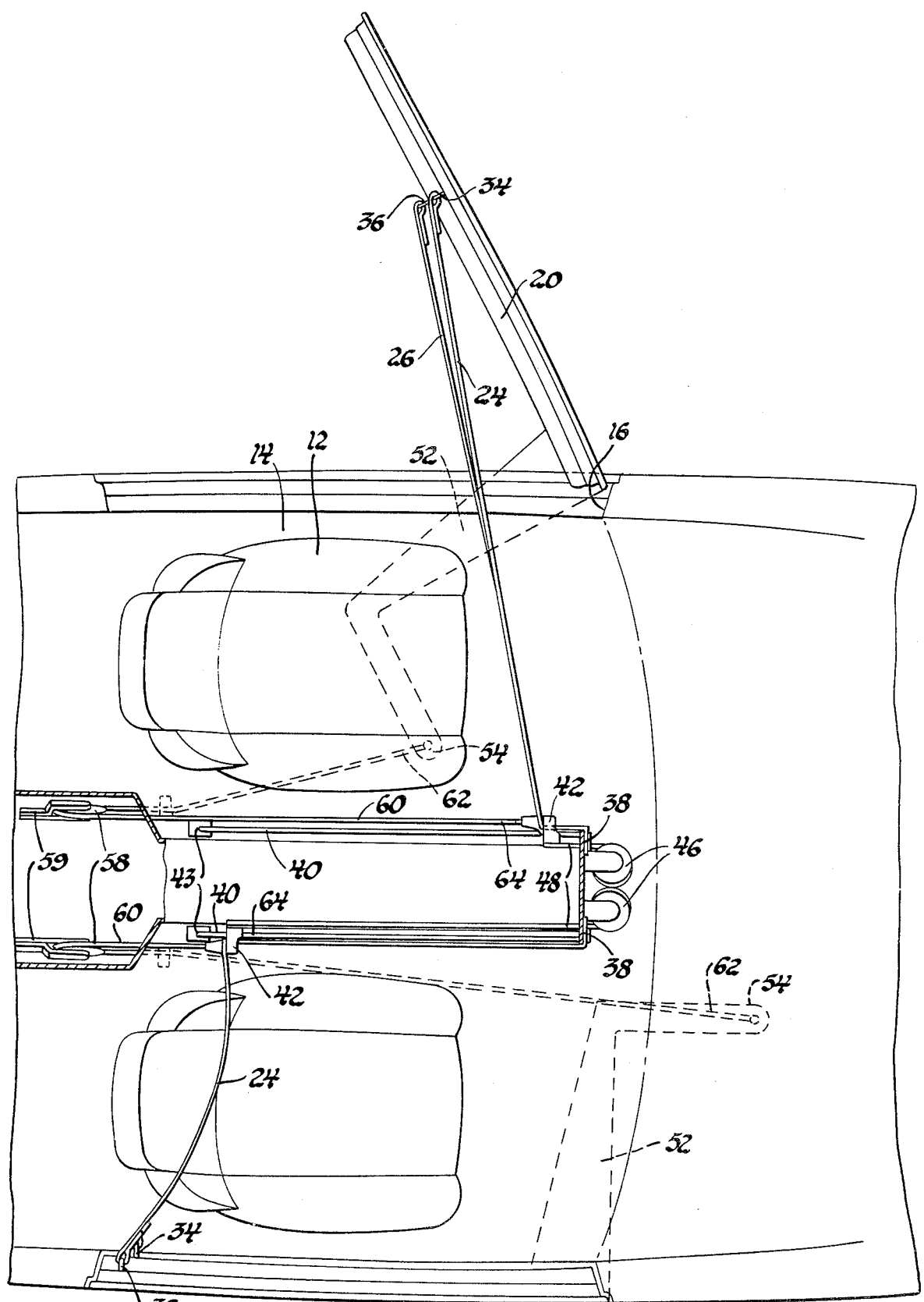
FIG. 2 is a plan view of the seat belt system of FIG. 1 showing the driver's door in the open position establishing the lap and shoulder belts in their forwardly stowed position allowing occupant ingress and egress and the passenger door in the closed position establishing the lap and shoulder belts in their rearward restraining positions.

A track 40 and a carriage 42 cooperate to move the inboard portions of the shoulder belt 24 and lap belt 26 between the occupant restraining position of FIG. 2 and the forwardly stowed position of FIG. 2. As best seen in FIG. 1, the track 40 has a forward end 41 attached to a suitably reinforced portion of the instrument panel structure and a rearward end 43 suitably attached to the vehicle floor pan 14 inboard the seat 12. The carriage 42 is suitably mounted for sliding movement along the track 40 between a rearward position of FIG. 1 generally adjacent the hip of the seated occupant and the forward position of FIG. 2 generally adjacent the instrument panel structure. The belt carriage 42 has a slide loop 44 which slidably receives the shoulder belt 24 and the lap belt 26. A spring reel assembly 46 is mounted on the instrument panel adjacent the forward end of the track 40 and winds a flexible element 48 which is attached to the carriage 42 to urge movement of the carriage 42 to its forwardmost position adjacent the instrument panel structure.

A lever arm 52 is suitably connected to the door 20 for pivotal movement therewith about the hinge axis of the door. The lever arm 52 has an inboard end 54 which, as best seen in FIG. 2, moves generally rearwardly as the door is being opened and moves generally forwardly as the door is being closed.

A pulley 58 is rotatably mounted on the vehicle body by a suitable bracket 59 and is situated generally adjacent the rearward end 43 of the track 40. A cable 60 surrounds the pulley 58 and has an end 62 suitably attached to the inboard end 54 of the lever arm 52 and another end 64 suitably attached to the carriage 42.

It will be understood that the lever arm 52 is situated on the vehicle body 10 in a manner which minimizes interference with the occupant compartment. For example, the lever arm 52 may be concealed beneath a false floor of the vehicle compartment. On the other hand, the lever arm 52 may be situated beneath the floor pan 14 of the vehicle body or within the engine compartment.

Referring to FIG. 2, it is seen that movement of the door between the open and closed positions automatically moves the lap and shoulder belts between their forwardly stowed positions and the rearward restraining positions. FIG. 2 shows the driver's door 20 in the open position wherein the inboard end 54 of lever arm 52 has been moved rearwardly permitting the cable 60 to pass around the pulley 58 and permit forward movement of the belt carriage 42 by the spring reel assembly 46. Forward movement of the carriage 42 positions the inboard portions of the shoulder and lap belts 24 and 26 substantially forward of the occupant seat to facilitate occupant ingress and egress. The outward swinging movement of the door 20 simultaneously moves the outboard belt ends outwardly while the linear retractor assemblies 30 and 32 permit their forward movement to further facilitate occupant ingress and egress as well as adjust the length of the belts to accommodate the change in system geometry as the door is opened and the carriage moved forwardly.

FIG. 2 also shows the passive seat belt system associated with the passenger seat of the vehicle body. Since the passenger seat belt system is identical to the driver seat belt system, like elements are designated by like numerals. By comparing the driver's open door with the passenger's closed door, it will be understood that closing movement of the door causes the inboard end 54 of the lever arm 52 to swing generally forwardly in an arc about the axis of door rotation to thereby pull the end 62 of cable 60 forwardly. As the cable end 62 is pulled forwardly, the cable end 64 is withdrawn in the rearward direction to forcibly move the belt carriage 42 to the rearward position which establishes the inboard portion of the lap and shoulder belts generally adjacent the occupant hip.

An important feature of the invention is that the carriage 42 is maintained in its rearward occupant restraining position without the necessity of any latching arrangement acting to restrain the carriage. When the vehicle is rapidly decelerated, the occupant restraining loads imposed upon the shoulder belt 24 and the lap belt 26 tend to pull the door closed and tend to move the belt carriage 42 forwardly. However, the interconnection between the carriage 42 and the door 20 provided by the lever arm 52, pulley 58, and cable 60 produce opposing moments of force about the axis of door rotation to provide a closed loop balance of occupant restraining forces. Accordingly, the carriage 42 is effectively restrained at its rearward position.

Figure 3:
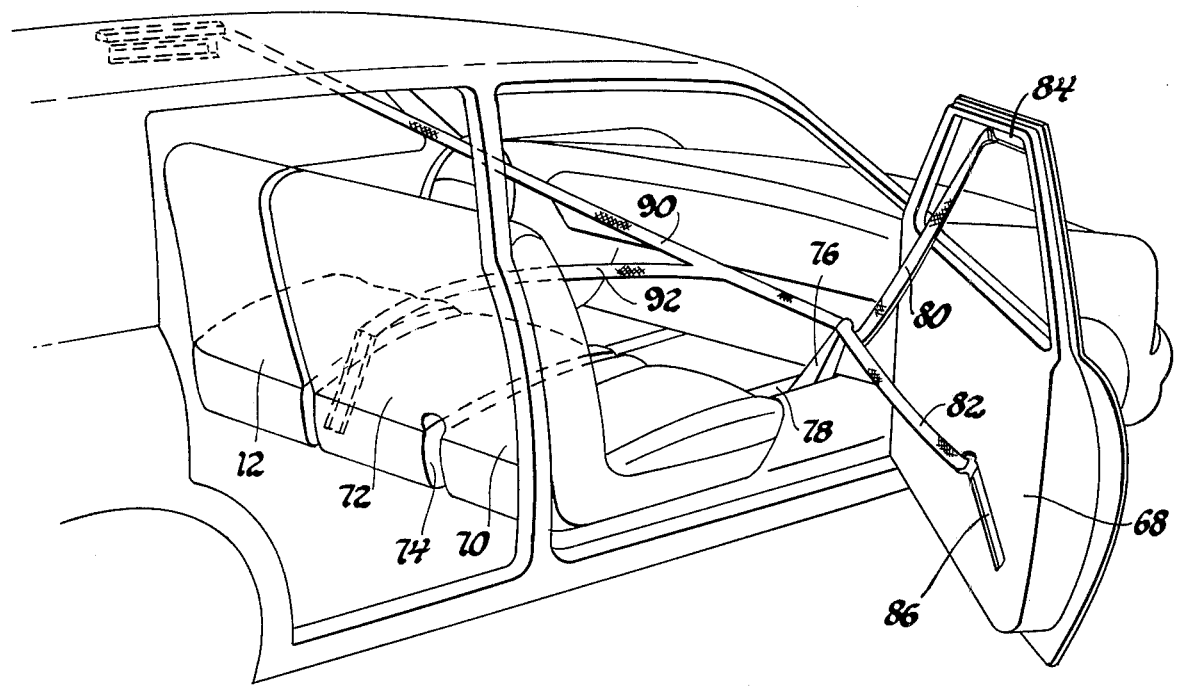
FIG. 3 is a perspective view of an automobile passenger compartment showing the invention adapted for restraint of an outboard occupant seated adjacent the open passenger door and a center seat occupant and wherein the belt carriage is located in the forward position to move the lap and shoulder belts for both occupants to their respective stowed position permitting ingress and egress of both occupants through the passenger door.

Referring to FIG. 3, it will be seen that the invention also includes a seat belt system for retraint of a center seat occupant and permits unobstructed access to the center seat from the passenger door. As seen in FIG. 3, the occupant compartment has an outboard driver seat 12, an outboard passenger seat 70 mounted adjacent a passenger door 68, and a center seat 72 which is located inboard the passenger seat 70 and between the passenger seat 70 and the driver seat 12. The seat belt system for restraint of the driver seat 12 is not shown in the drawings but may be provided according to the present invention or the prior art.

The seats 70 and 72 may have a common backrest but the seat cushions are separated to define a space 74 therebetween through which a carriage 76 is movable. The carriage 76 is mounted on a longitudinally extending track similar to the track 40 of FIGS. 1 and 2. The track is located on or beneath the vehicle floor so that the track does not present an obstruction to ingress and egress of the center occupant from the center seat 72. The carriage 76 is movable along the track 78 between a forward position of FIG. 3 located generally adjacent the instrument panel and a rearward position, not shown, generally adjacent and between the hips of the occupant of the center seat 72 and the occupant of the passenger seat 70. The carriage 76 may be moved along the track by the door interconnected mechanical drive mechanism as shown in FIGS. 1 and 2 or by a suitable prior art carriage drive mechanism such as shown in U.S. Pat. Coenen No. 3,833,239, issued Sept. 3, 1974, and incorporated herein by reference.

The restraint belt for the passenger seat 70 includes a shoulder belt 80 and a lap belt 82 having their outboard ends suitably connected to the passenger door 68 by linear locking retractor assemblies 84 and 86 such as previously described herein with reference to FIGS. 1 and 2. The inboard ends of the shoulder belt 80 and lap belt 82 are attached to the carriage 76 or are attached to the instrument panel and extend slidably through a slide loop on the carriage 76.

A restraint belt arrangement for restraint of the occupant of the center seat 72 includes a shoulder belt 90 and a lap belt 92. The ends of the shoulder belt 90 and lap belt 92 closest the door 68 are suitably attached to the carriage 76 or are attached to the instrument panel structure and extend slidably through a guide loop attached to the carriage. The end of the shoulder belt 90 furthest from the passenger door 68 is attached to the vehicle body roof structure by a suitable retractor assembly for retracting and extending the shoulder belt 90 upon movement of the carriage 76 between its forward and rearward positions. The end of lap belt 92 furthest from the door 68 is suitably mounted on the seat or vehicle body generally adjacent the hip of the occupant by a suitable retractor for extending and retracting the lap belt 92 during movement of the carriage 76 between the forward and rearward positions.

The carriage 76 and door 68 are interconnected by a lever arm and pulley and cable, not shown, similar to those disclosed in FIGS. 1 and 2. Accordingly, when the passenger door 68 is moved from its open position of FIG. 3 to the closed position, the lever and cable cooperate to forcibly retract the carriage 76 to its rearward position adjacent and between the hips of the occupant of the center seat 72 and the passenger seat 70. Accordingly, the carriage 76 carries the belts to their normal occupant restraining positions adjacent occupants of seats 70 and 72. The closing movement of the door 68 simultaneously positions the outboard ends of the shoulder belt 80 and lap belt 82 in the normal restraining positions relative the seat 70. During rearward movement of the carriage 76, the retractors 94 and 96 associated with the ends of shoulder belt 90 and lap belt 92 retract the belts to their respective restraining positions about the occupant of the center seat 72. Accordingly, it will be understood that when the carriage 76 is located in the forward position of FIG. 3 generally adjacent the instrument panel structure, the center seat occupant is permitted unobstructed ingress and egress through the passenger door 68 to the center seat 72. When the door is closed, the carriage 76 is automatically retracted to the rearward position establishing the belts for restraint of both occupants.

While the invention has been disclosed herein primarily in terms of the specific and preferred embodiments shown in the drawings, it is not intended to be limited thereto, but rather only to the extent set forth in the appended claims. For example, in FIG. 1 there is disclosed a spring reel assembly 46 for normally drawing the belt carriage 42 to the forward position. However, it will be appreciated that outward and forward movement of the belts during outward swinging of the door will induce forward movement of the belt carriage 42 independently of the additional contribution of a spring reel assembly 46. Furthermore, while each of the drawings shows a linear locking retractor on the door for mounting the outboard belt ends, these retractors could be replaced by a rotary retractor or, depending upon the geometry of the particular vehicle and seat belt system, a retractor may not be necessary at all. Furthermore, the retractor associated with the belts may be provided at the instrument panel structure end thereof instead of on the door.

Furthermore, with reference to the seat belt system of FIG. 3, the use of a door operated lever and cable arrangement is not mandatory and the carriage may be moved between the fore and aft positions according to the teachings of Coenen U.S. Pat. No. 3,833,239 or the German Offenlegungsschrift No. 2,248,636.

Thus, it is seen that the invention provides a new and improved passive occupant restraining seat belt system.

The embodiments of the invention in which an exclusive property or privilege is claimed are defined as follows:

1. In a vehicle body having a door pivoted about its forward end laterally adjacent a seat mounted in an occupant compartment, a passive occupant restraint belt system comprising:

a belt having an outboard end mounted on the door and an inboard end mounted on the body inboard and forward of the occupant seat;

a longitudinally extending track mounted on the vehicle body inboard the occupant seat;

a carriage mounted on the track slidably engaging the belt intermediate the inboard and outboard ends, so that outward swinging opening movement of the door moves the outboard belt end outwardly and forwardly of the seating position and induces sliding movement of the belt through the carriage and forward movement of the carriage to stow the belt in an occupant access position forwardly of the occupant;

mechanical drive means interconnecting the door and the carriage independent of the belt to move the carriage rearwardly on the track during closing movement of the door to establish the belt in a restraining position closely adjacent the occupant whereby the carriage is effectively coupled with the door so that occupant restraining load inducing forward movement of the carriage is counterbalanced by the occupant restraining load urging closure of the door to maintain the belt in the occupant restraining position.

2. In a vehicle body having a door pivoted about its forward end laterally adjacent a seat mounted in an occupant compartment, a passive occupant restraint belt system comprising:

a lap belt and a shoulder belt having outboard ends mounted on the vehicle door and inboard ends mounted on the vehicle body inboard and forward the occupant seat;

a longitudinally extending track mounted on the vehicle body inboard the occupant seat;

a carriage mounted on the track and slidably engaging the lap and shoulder belts intermediate their inboard and outboard ends to dispose the lap and shoulder belts in restraining positions closely adjacent the occupant when the carriage is at a rearward position and to dispose the belts in the occupant access position stowed forwardly of the occupant when the carriage is moved forwardly along the track;

spring means urging the carriage forwardly;

an arm operably associated with the door and having an inboard end movable rearwardly when the door is opened and forwardly when the door is closed;

and cable drive means operatively connecting the inboard end of the arm with the carriage to effect rearward movement of the carriage when the door is closed and whereby the arm and cable drive means cooperate to maintain the carriage in the rearwardmost position whenever the door is in the closed position.

3. In a vehicle body having a door pivoted about its forward end laterally adjacent a seat mounted on the vehicle body floor, said seat having a first seating position for a first occupant adjacent the door, a second seating position inboard the first seating position for seating a second occupant and a third seating position for seating a third occupant adjacent the second seating position, a passive occupant restraint belt system for restraining the first and second occupants and permitting ingress and egress of both occupants through the door comprising:

a longitudinally extending track mounted on the vehicle body floor between the first and second seating positions; and constructed in a non-obstructing manner permitting occupant movement between the first and second seating positions;

a belt carriage movable on the track between a rearward position adjacent the hips of the first and second occupants and a position spaced forwardly of the seat to permit unobstructed ingress and egress of the second occupant from the second seating position;

a first restraint belt for the first occupant including an outboard end mounted on the door and an inboard end mounted on the carriage;

a second restraint belt for the second occupant having an outboard end mounted on the carriage and an inboard end retractably mounted on the vehicle body between the second and third occupants;

and means for moving the carriage forwardly when the door is open to dispose the inboard end of the first belt and outboard end of the second belt forwardly of the seat to permit unobstructed ingress and egress of both the first and second occupants through and for moving the carriage to the rearward position when the door is closed to dispose the first and second belts in their respective restraining positions about the first and second seat occupants when the door is closed.

4. In a vehicle body having a door pivoted about its forward end laterally adjacent a seat mounted on the vehicle body floor, said seat having a first seating position for seating a first occupant adjacent the door, a second seating position situated inboard the first seat cushion for seating a second occupant and a third seating position for seating a third occupant adjacent the second seating position, a passive occupant restraint belt system for restraining the first and second occupants and permitting ingress and egress of both occupants through the door comprising:

a longitudinally extending track mounted on the vehicle body floor between the first and second seating positions and constructed in a manner permitting occupant movement between the first and second seating positions;

a first restraint belt for the first occupant having an outboard end mounted on the door and an inboard end mounted on the body inboard and forward of the first seating position;

a belt carriage longitudinally movable on the track and slidably engaging the first restraint belt intermediate the inboard and outboard ends so that outward swinging movement of the door moves the outboard first belt end outwardly and forwardly of the seating position and induces sliding movement of the belt through the carriage and forward movement of the carriage to position the carriage forwardly of the seat to permit unobstructed ingress and egress of the second occupant and to dispose the first belt in a stowed position forwardly of the first occupant;

a second restraint belt for the second occupant having an outboard end connected to the carriage and an inboard end retractably mounted on the vehicle body between the second and third seating positions so that the second belt is disposed in a stowed position forwardly of the seat when the carriage is in the forward position;

and mechanical drive means interconnecting the door and the carriage to forcibly move the carriage rearwardly adjacent the hip of the first and second occupants during closing movement of the door to establish the first and second belts in restraining positions closely adjacent the first and second occupants whereby the carriage is effectively coupled with the door so that the occupant restraining load inducing forward movement of the carriage is counterbalanced by the occupant restraining load urging closure of the door to maintain the first and second belts in their respective occupant restraining positions.

5. A motor vehicle having a passenger seat adapted to seat first and second outboard passengers; and a center occupant; first and second door openings adjacent the outboard passengers; first and second doors swingable about substantially vertical axes forward of the passengers to permit ingress and egress of the first outboard passenger through the adjacent first door opening and to permit ingress and egress of both the second outboard and center passenger through the door opening adjacent the second outboard passenger;

means defining a seat belt anchoring member located below and between the second outboard and center passengers and movable along a longitudinal path in relation to the vehicle from a rearward position defining an effective seat belt anchorage for both passengers and a forward position providing unobstructured clearance for ingress and egress of the center passenger through the door opening adjacent the second outboard passenger;

a center passenger belt anchored at one end to said anchoring member and anchored at the other end to the vehicle between the first outboard and center passengers to form a seat belt restraint for the center passenger when anchoring member is in the rearward position; p1 a second outboard passenger belt anchored at one end to said anchoring member and anchored at the other end to the door adjacent the second outboard passenger at a location forming a seat belt restraint for the second outboard passenger when the door is closed and said anchoring member is in the rearward position; and means effective to move said anchoring member between the rearward and the forward positions so as to permit ingress and egress of the second outboard and center passengers from the motor vehicle.

* * * * *